(12) United States Patent
Wolfe, Jr. et al.

(10) Patent No.: US 7,555,997 B2
(45) Date of Patent: Jul. 7, 2009

(54) CONTAINER APPARATUS AND METHOD

(75) Inventors: Jerry Joe Wolfe, Jr., Sarasota, FL (US); Harold Keith Benson, Hutto, TX (US); Robert Troy Dunn, Hutto, TX (US); Jessy B. Gabriel, Hutto, TX (US); David John Kroyer, Hutto, TX (US)

(73) Assignee: Triple Crown Dog Academy, Inc., Hutto, TX (US)

( * ) Notice: Subject to any disclaimer, the term of this patent is extended or adjusted under 35 U.S.C. 154(b) by 0 days.

(21) Appl. No.: 10/706,410

(22) Filed: Nov. 12, 2003

(65) Prior Publication Data
US 2005/0115517 A1 Jun. 2, 2005

(51) Int. Cl.
*A01K 29/00* (2006.01)
(52) U.S. Cl. ...................... 119/707; 119/709
(58) Field of Classification Search ......... 119/707–711; 222/142.1, 142.2, 142.5, 457.5
See application file for complete search history.

(56) References Cited

U.S. PATENT DOCUMENTS

| | | |
|---|---|---|
| 744,718 A | 11/1903 | Cassidy |
| 848,136 A | 3/1907 | Smith |
| 1,006,182 A | 10/1911 | Cousin |
| 1,022,112 A | 4/1912 | Smith |
| 1,031,095 A | 7/1912 | Smith |
| 1,149,170 A | 8/1915 | Allis |
| 1,483,165 A | 2/1924 | Eaton |
| 1,534,964 A | 4/1925 | Kahnweiler |
| 1,843,864 A | 2/1932 | Burnett |
| 2,086,631 A | 7/1937 | Munro |
| 2,187,524 A | 1/1940 | Price |
| 2,194,736 A | 3/1940 | Bruler |
| 2,610,851 A | 9/1952 | Jones |
| D188,179 S | 6/1960 | Tay |
| 3,071,476 A | 1/1963 | Werft et al. |
| 3,104,648 A | 9/1963 | Fisher |
| 3,107,651 A | 10/1963 | Beck |
| 3,122,129 A | 2/1964 | Wise |
| 3,251,600 A | 5/1966 | Warnberg |

(Continued)

FOREIGN PATENT DOCUMENTS

CA 2 240 524 6/1997

(Continued)

OTHER PUBLICATIONS

The Kong Company; "Recipe for the Almost Perfect Dog", Golden, Colorado; Kong Co. 1997; 2 pages; http://www.kongcompany.com.

(Continued)

*Primary Examiner*—Kimberly S Smith
(74) *Attorney, Agent, or Firm*—Dillon & Yudell L.L.P.; Brian F. Russell

(57) ABSTRACT

A container apparatus and method includes an exterior form, with an outside and an inside, the exterior form surrounding an interior form with a compartment wherein the exterior form includes at least one space for containing items on the inside and wherein the compartment includes at least one space for containing items. At least one opening is provided in the interior form and at least one opening is provided in the exterior form.

11 Claims, 4 Drawing Sheets

U.S. PATENT DOCUMENTS

| | | | |
|---|---|---|---|
| 3,664,303 A | | 5/1972 | Baensch |
| 3,679,212 A | * | 7/1972 | Smith ..................... 273/144 B |
| 3,785,347 A | | 1/1974 | Dinnerstein |
| 3,871,334 A | | 3/1975 | Axelrod |
| 3,899,607 A | | 8/1975 | Miller et al. |
| 3,954,269 A | * | 5/1976 | Brittingham ................ 273/146 |
| 3,964,438 A | | 6/1976 | Rodemeyer |
| 4,032,665 A | | 6/1977 | Miller et al. |
| 4,194,737 A | * | 3/1980 | Farmer ...................... 473/570 |
| 4,228,920 A | * | 10/1980 | Burton ....................... 221/265 |
| 4,513,014 A | | 4/1985 | Edwards |
| 4,515,373 A | * | 5/1985 | Hirshfeld .................... 273/317 |
| 4,557,219 A | | 12/1985 | Edwards |
| D287,988 S | | 1/1987 | Billinghurst |
| 4,802,444 A | | 2/1989 | Markham et al. |
| 4,826,043 A | * | 5/1989 | Matz et al. ................. 221/263 |
| D307,339 S | | 4/1990 | Markham et al. |
| 4,919,083 A | | 4/1990 | Axelrod |
| D308,122 S | | 5/1990 | Markham et al. |
| D314,455 S | | 2/1991 | Morton |
| 5,025,753 A | | 6/1991 | Schneider |
| 5,123,378 A | | 6/1992 | Bayne |
| 5,165,363 A | | 11/1992 | McGinty |
| RE34,352 E | | 8/1993 | Markham et al. |
| 5,232,130 A | | 8/1993 | Woodard |
| 5,263,436 A | | 11/1993 | Axelrod |
| D343,262 S | | 1/1994 | Axelrod |
| D344,161 S | | 2/1994 | Markham |
| D349,786 S | | 8/1994 | Markham |
| 5,343,828 A | | 9/1994 | Houghton et al. |
| D357,952 S | | 5/1995 | Chen |
| D359,147 S | | 6/1995 | Hotta et al. |
| 5,476,408 A | * | 12/1995 | Hoeting et al. ............. 446/419 |
| 5,536,007 A | | 7/1996 | Snyder |
| D373,229 S | | 8/1996 | O'Rourke et al. |
| D373,859 S | | 9/1996 | Markham et al. |
| 5,553,570 A | | 9/1996 | VanNatter, III et al. |
| 5,595,142 A | | 1/1997 | Chill |
| 5,619,954 A | | 4/1997 | Rotondi |
| 5,640,931 A | | 6/1997 | Markham |
| D387,513 S | | 12/1997 | Mauldin, Jr. |
| D388,559 S | | 12/1997 | Mauldin, Jr. |
| D393,110 S | | 3/1998 | Mauldin, Jr. |
| 5,799,616 A | | 9/1998 | McClung, III |
| 5,813,366 A | | 9/1998 | Mauldin |
| 5,832,877 A | | 11/1998 | Markham |
| 5,857,431 A | | 1/1999 | Peterson |
| 5,865,146 A | | 2/1999 | Markham |
| 5,904,118 A | | 5/1999 | Markham |
| 5,924,942 A | | 7/1999 | Gentile |
| 5,947,061 A | | 9/1999 | Markham |
| 5,965,182 A | | 10/1999 | Lindgren |
| 6,073,581 A | * | 6/2000 | Wang ..................... 119/51.01 |
| 6,109,210 A | * | 8/2000 | Nasser .................... 119/51.04 |
| 6,129,053 A | | 10/2000 | Markham |
| 6,148,771 A | * | 11/2000 | Costello ..................... 119/709 |
| 5,813,366 C1 | | 2/2001 | Mauldin Jr. |
| 6,186,095 B1 | * | 2/2001 | Simon ....................... 119/707 |
| 6,186,096 B1 | | 2/2001 | Miller |
| 6,439,166 B1 | * | 8/2002 | Markham .................. 119/710 |
| 6,470,830 B2 | | 10/2002 | Mann |
| 6,484,671 B2 | | 11/2002 | Herrenbruck |
| 6,634,318 B1 | * | 10/2003 | Rucker ...................... 119/709 |
| 7,146,934 B1 | * | 12/2006 | Staley ....................... 119/709 |
| RE39,563 E | | 4/2007 | Markham |
| 2003/0079693 A1 | * | 5/2003 | Jager ......................... 119/707 |
| 2004/0200434 A1 | * | 10/2004 | Shatoff et al. ............... 119/707 |
| 2004/0244719 A1 | * | 12/2004 | Jager ......................... 119/709 |
| 2005/0045115 A1 | * | 3/2005 | Mann ........................ 119/711 |

FOREIGN PATENT DOCUMENTS

| | | | |
|---|---|---|---|
| FR | 2 633 525 A1 | | 6/1988 |
| IE | 82913 B3 | * | 6/2003 |
| WO | WO 99 25183 | | 5/1999 |

OTHER PUBLICATIONS

The Kong Company; "Kong Stuffing Good Medicine for Bad Behavior"; Lakewood, Colorado, Pet Business Magazine; May 1995.

* cited by examiner

CONTAINER APPARATUS AND METHOD

FIELD OF THE INVENTION

This invention relates to a container apparatus and method. In particular, according to one embodiment, the invention relates to a container apparatus including an exterior form surrounding an interior form with a compartment such that both the exterior form and the interior form include spaces for containing items. At least one opening in the exterior form and the interior form are provided. According to one embodiment, the container takes the form of a ball and the items are edible animal treats.

BACKGROUND OF THE INVENTION

Play is an important part of human and animal development. A wide variety of devices have been created to assist in the objective of providing meaningful and rewarding play time for children and pets. By way of example only and not by limitation, in the arena of dog training, it is important that the trainer establish a close bond with the animal in order for training to be effective and meaningful. The most effective training is training that is delivered in a positive, playful and safe environment. Additionally, there are times when training an animal when the objective is simply to play.

Again, by way of example and not by limitation, a wide variety of devices have been developed for the distribution of treats to pets in the form of treat dispensing toys. The Herrenbruck patent, U.S. Pat. No. 6,484,671, discloses a treat dispensing toy with a sound device. The toy is inedible and contains small treats that work their way past interior obstacles to an exit. The Miller patent, U.S. Pat. No. 6,186,096, discloses a retractable, extendable, edible chew treat in a hard inedible covering. A human must manipulate the toy to extract or retract a treat from the toy. The Markham patents, U.S. Pat. Nos. 6,129,053 and 5,947,061, disclose an inedible toy with treat receiving and retaining receptacles of various sizes and depths in the surface of the toy. Another Markham patent, U.S. Pat. No. 5,865,146, discloses an edible treat retained in a deformable, inedible bouncing pet toy. As the dog chews on the inedible toy, the treat is crushed and parts of it escape the container. The Mauldin patent, U.S. Pat. No. 5,813,366, discloses another inedible toy with a receptacle for retaining an edible treat.

While the idea of including edible treats with a toy has clearly been done, problems exist with prior art devices and methods. One problem is with the delivery of the treats from the interior of the device. In some cases, the items held within the container are distributed almost immediately such that the duration of the play time and interest in the device is very short. Another problem is with the containers themselves. In the situation where the container is not activated by human movement, prior art containers are more or less predictable in their movements and therefore less interesting to animals. Thus, there is a need in the art for providing a container apparatus and method which maintains the interest of the user for extended periods of time and provides for interesting, unpredictable movements while slowly dispensing items contained within the container. It, therefore, is an object of this invention to provide an improved container apparatus and method for dispensing the items, such as animal treats, for example only.

SUMMARY OF THE INVENTION

The container apparatus and method of the present invention includes, according to one embodiment, an exterior form, with an outside and an inside, surrounding an interior form with a compartment wherein the exterior form includes at least one space for containing items on the inside and wherein the compartment includes at least one space for containing items. At least one opening in the interior form and at least one opening in the exterior form is provided.

According to another aspect of the invention, the exterior form further includes at least one at least partially circumferential raised element on the outside of the exterior form. In another aspect, the interior form is offset from a center location of the exterior form. According to a further aspect, the at least one opening in the interior form includes a funnel section for funneling items to the at least one opening in the interior form. According to a further aspect, a removable cap is provided for the at least one opening in the exterior form. In other embodiment, the removable cap is edible and the items are edible. In another aspect of the invention, the exterior form includes an interior recess in combination with the interior form for receiving and retaining a removable cap. In another aspect, the exterior form includes two openings and, in a further aspect, the interior form includes two openings.

According to another embodiment of the invention, an animal treat ball includes a ball, with an outside and an inside, surrounding a separate interior form with a compartment wherein the ball includes at least one space for containing animal treats on the inside and wherein the compartment includes at least one space for containing animal treats. Further, at least one opening in the interior form and at least one opening in the exterior form is provided.

In a further aspect of this embodiment, the ball includes at least one at least partially circumferential raised element on the outside of the ball. In another aspect, the ball includes a sinuous raised edge on the exterior of the ball. Other aspects of this embodiment of this invention are provided as well as set forth hereafter.

According to a further embodiment of the invention, an animal treat ball method includes the steps of providing a ball, with an outside and an inside, surrounding a separate interior form with a compartment wherein the ball includes at least one space for containing animal treats on the inside and wherein the compartment includes at least one space for containing animal treats. At least one opening is provided in the interior form and at least one opening is provided in the exterior form. Thereafter, animal treats are inserted into the ball.

DETAILED DESCRIPTION OF THE INVENTION

Figure 1:
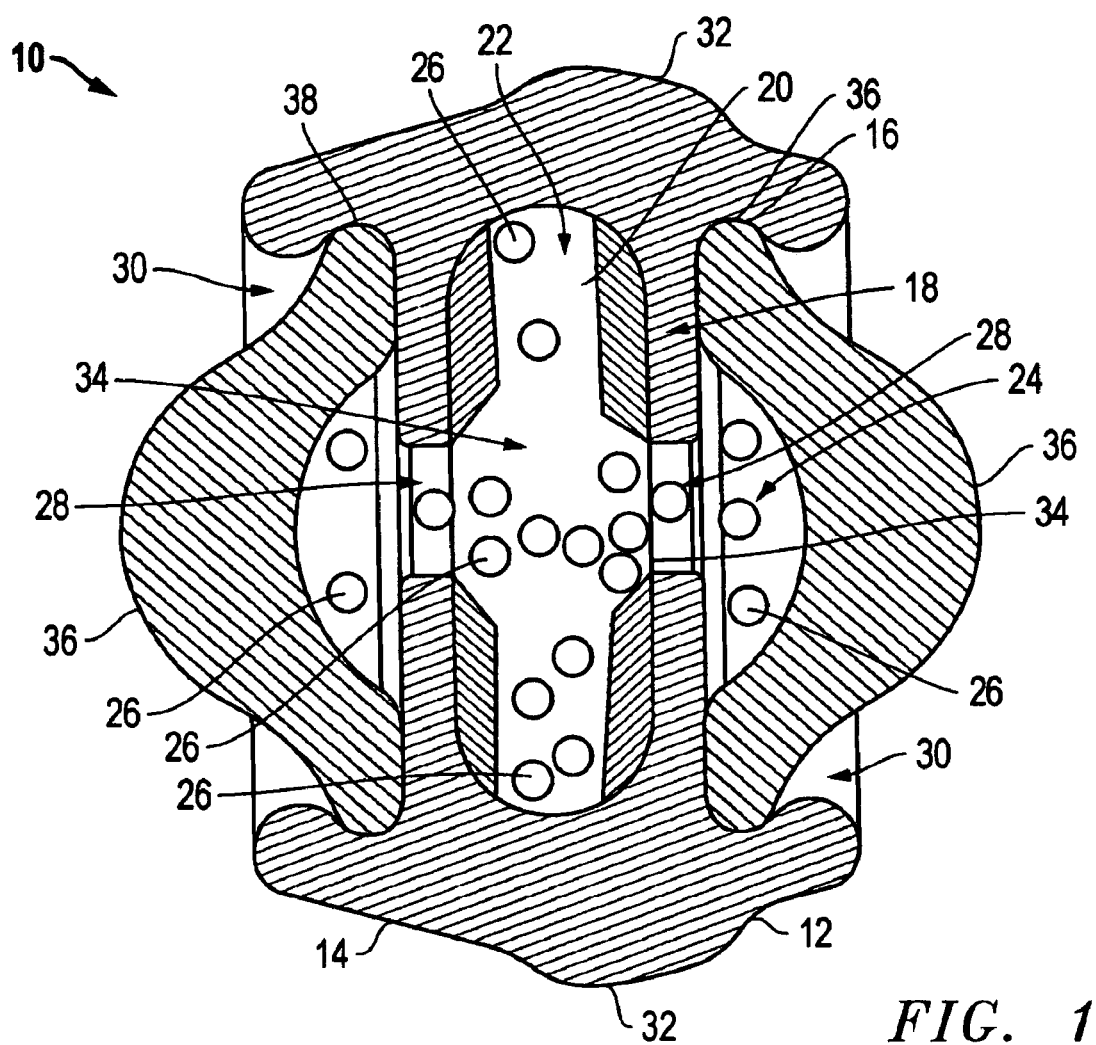
FIG. 1 is a cross-sectional view of the container apparatus according to one embodiment of the present invention.

An embodiment of the present invention is illustrated by way of example in FIGS. 1-5. With specific reference to FIG. 1, a container apparatus 10 according to one embodiment of the present invention includes an exterior form 12 with an outside 14 and an inside 16. Exterior form 12 surrounds interior form 18. Interior form 18 includes a compartment 20. Compartment 20 includes space 22. Further, exterior form 12 includes at least one space 24. Both space 22 and space 24 are conformed for containing items 26. Still further, interior form 18 includes at least one opening 28 and exterior form 12 includes at least one opening 30.

Exterior form 12 may be made of any substance now known or hereafter developed. According to one embodiment, exterior form 12 is a soft yet durable, tear resistant plastic like material. Preferably, container apparatus 10 exterior form 12 is highly resilient and highly resistant to deformation and destruction when chewed and/or clawed upon by an animal, such as a dog, for example only. Exterior form 12 may be in any shape desired, rectangular, circular, cylindrical, spherical, prismatic, oblong, ovoid and/or irregular. According to the embodiment illustrated in FIGS. 1, 2 and 5, exterior form 12 is in the shape, approximately, of a ball. As used herein the term "ball" includes any form including barrel, cylindrical, oblong or the like. Certainly, again, exterior form 12 may even be square, rectangular or the like. Likewise, interior form 18 may be in any shape now known or hereafter developed and/or desired. That is to say, interior form 18 may be in the form of a "ball" including a rectangle, square, sphere, or any other useful form.

Figure 2:
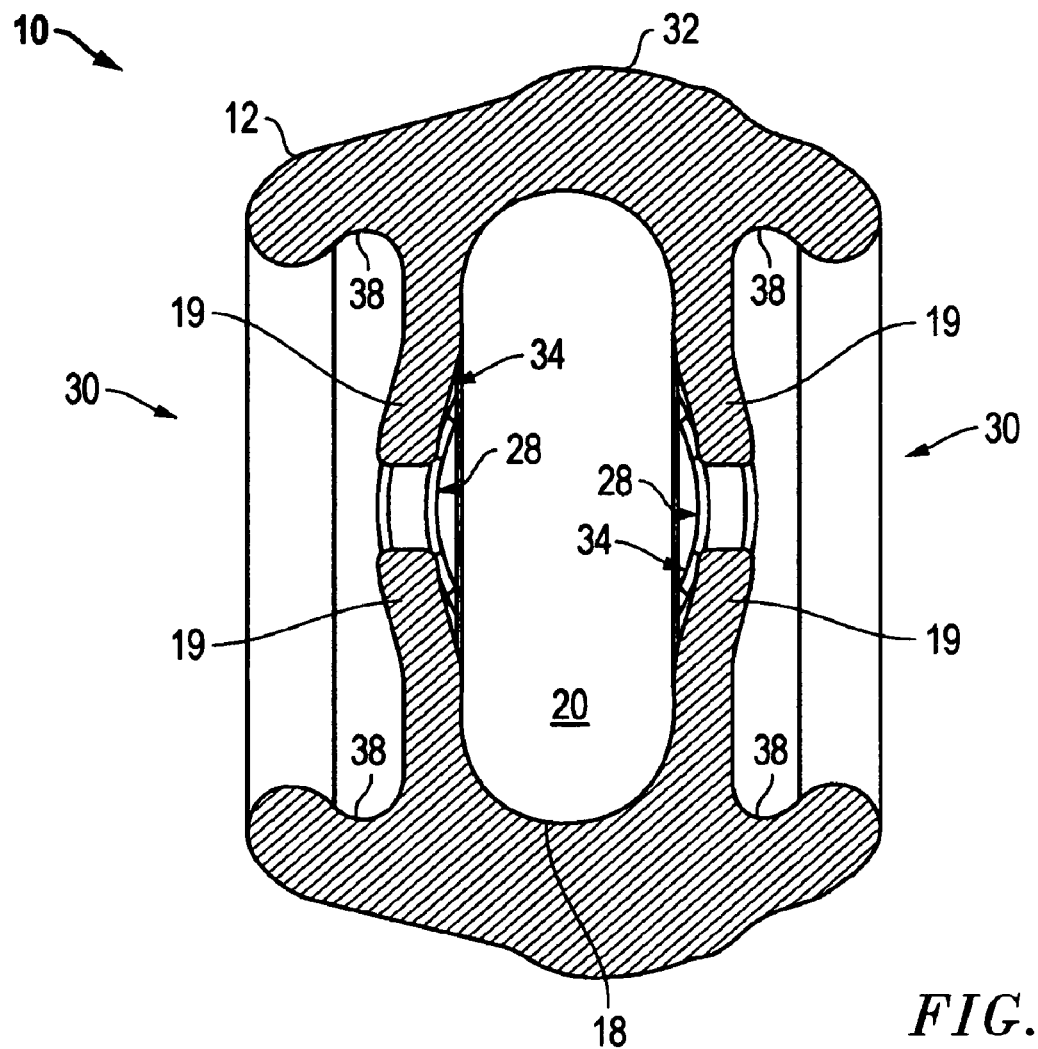
FIG. 2 is a cross-sectional view of another embodiment of the invention of FIG. 1 without end caps.

Still referring to FIG. 1, according to one embodiment of the invention, the outside 14 includes at least one at least partially circumferential raised element 32 on the outside 14 of exterior form 12. Also, FIG. 1 illustrates another embodiment of the invention wherein the opening 28 in the interior form 18 forms a funnel 34 for funneling items 26 to the opening 28 in the interior form 18 from within compartment 20. As illustrated, funnel 34 is created by gradually removing or reducing part of the compartment 20 as it nears opening 28 in the interior form 18. Obviously, funnel 34 may be created by adding material on the inside of compartment 20 as clearly indicated in FIG. 1 or by forming the material around opening 28 to form a funnel 34 as illustrated in FIG. 2. Funnel 34 may take any form or shape now known or hereafter developed so long as it increases the movement of items 26 from within compartment 20 towards opening 28 such that items 26 leave compartment 20.

FIG. 1 also illustrates another aspect of the invention wherein a removable cap 36 is provided for covering opening 30 in the exterior form 12. Removable cap 36 may take any shape now known or hereafter developed or desired. According to one aspect of the invention, cap 36 is domed shaped to conform to the shape of the exterior form 12 in the general shape of a ball. This "domed" shape for the cap 36 facilitates rolling of the container apparatus 10. Still further, removable cap 36 according to one embodiment is edible. According to another embodiment items 26 are also edible. According to further embodiments, edible removable cap 36 and items 26 are edible animal treats, such as dog biscuits, cat food, or the like, for example only. Obviously, items 26 in the form of edible treats, includes edible treats that are nutritious too.

A still further aspect of the invention is illustrated in FIG. 1 wherein opening 30 of exterior form 12 includes an interior recess 38 in combination with interior form 18 for receiving and retaining removable cap 36. As illustrated, interior recess 38 creates a lip on the inside 16 of the exterior form 12 while the area of interior form 18 next to recess 38 completes the interior recess 38 such that interior recess 38 is capable of receiving and retaining removable cap 36.

A further embodiment of the invention is illustrated in FIG. 1, wherein two openings 28 and two openings 30 are provided. In this situation, one removable cap 36 may be replaced with a permanent one on one of the two openings 30, for example only.

Referring now to FIG. 2, a cross-sectional view of a slightly different embodiment of the container apparatus 10 is illustrated. In this embodiment, the funnel 34 is formed by a depression of the ends 19 around the opening 28 outwardly from compartment 20 toward opening 30 of exterior form 12. As is known in the art, compartment 20 may be formed by forming interior form 18 around a removable object, such as injection mold form (not shown). Once the interior form 18 is sufficiently solid, the object (not shown) around which it was formed is removed leaving the interior form 18 in the desired shape. As will be discussed more fully hereafter with regard to FIG. 4, a novel item 26 retaining device of the present invention may facilitate the removal of the object as well.

Figure 3:
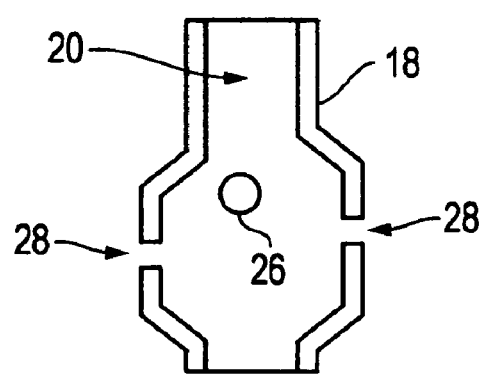
FIG. 3 is a detailed view of an off center interior embodiment of the invention of FIG. 1.

Referring now to FIG. 3, a detailed or isolated view of the interior form 18 and compartment 20 is provided. As illustrated, according to this embodiment, interior form 18 and compartment 20 are off center in relation to the center of exterior form 12 as illustrated previously in FIGS. 1 and 2. As a result of this configuration, items 26 are largely contained in an area away from the center of exterior form 12 thus contributing to erratic movement of exterior form 12 as it is moved about. By way of example only and not by limitation, when exterior form 12 takes the form of a ball, the utilization of off center interior form 18 creates a wobble in the container apparatus 10 as it is moved about.

As also illustrated in FIG. 3, the openings 28 in the interior form 18 may also be off center or misaligned one from the other such that items 26 are allowed or enabled to leave compartment 20 and enter space 24 of exterior form 12 in an uneven distribution around the center of exterior form 12.

Figure 4:
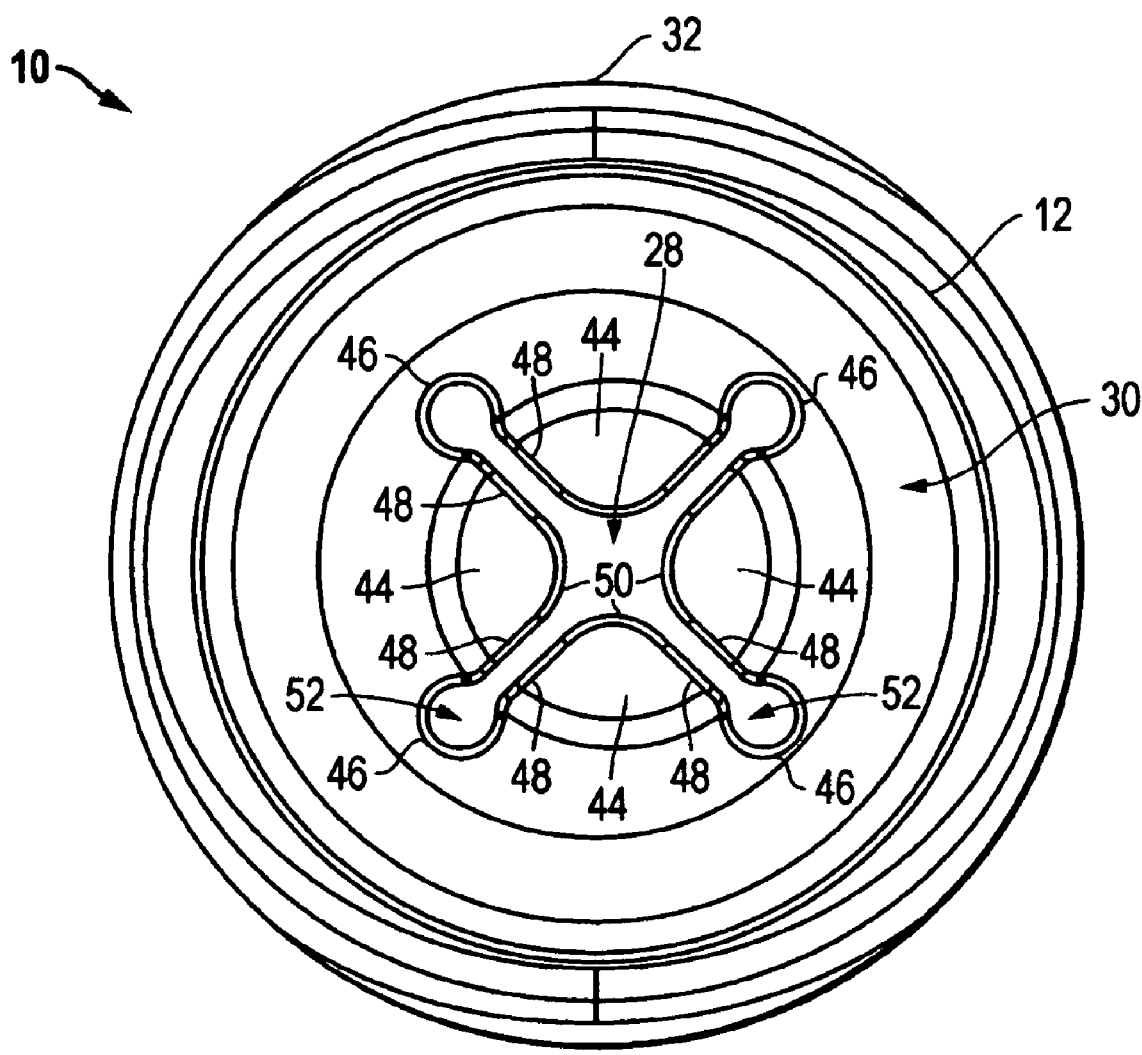
FIG. 4 is an end view of the embodiment of FIGS. 1 and 2.

Referring now to FIG. 4, an end view of an embodiment of the container apparatus 10 of the present invention is illustrated. According to this embodiment, opening 28 in interior form 18 is created by a series of slightly separated flaps 44. FIG. 4 shows four symmetrical, evenly spaced, flaps 44. In this embodiment, tear resistant circles 46 are located at the base of the flaps 44. The edges 48 are evenly spaced apart from the edges 48 of other flaps 44. The tips 50 of flaps 44 are spaced apart from each other to create the biggest open area of opening 28. Thus, by selecting the size of items 26, they may be released from compartment 20 at the opening 52 formed by tear resistant circles 46, between edges 48 or between the tips 50 of flaps 44. This unique flap 44 configuration allows complicated objects used to create interior form 18 to easily be removed and allows the user to selectively control the size of opening 28 so that items 26 are not too easily and readily released from compartment 20. Obviously, any size, shape, or number of flaps 44 may be used as desired and convenient.

Figure 5:
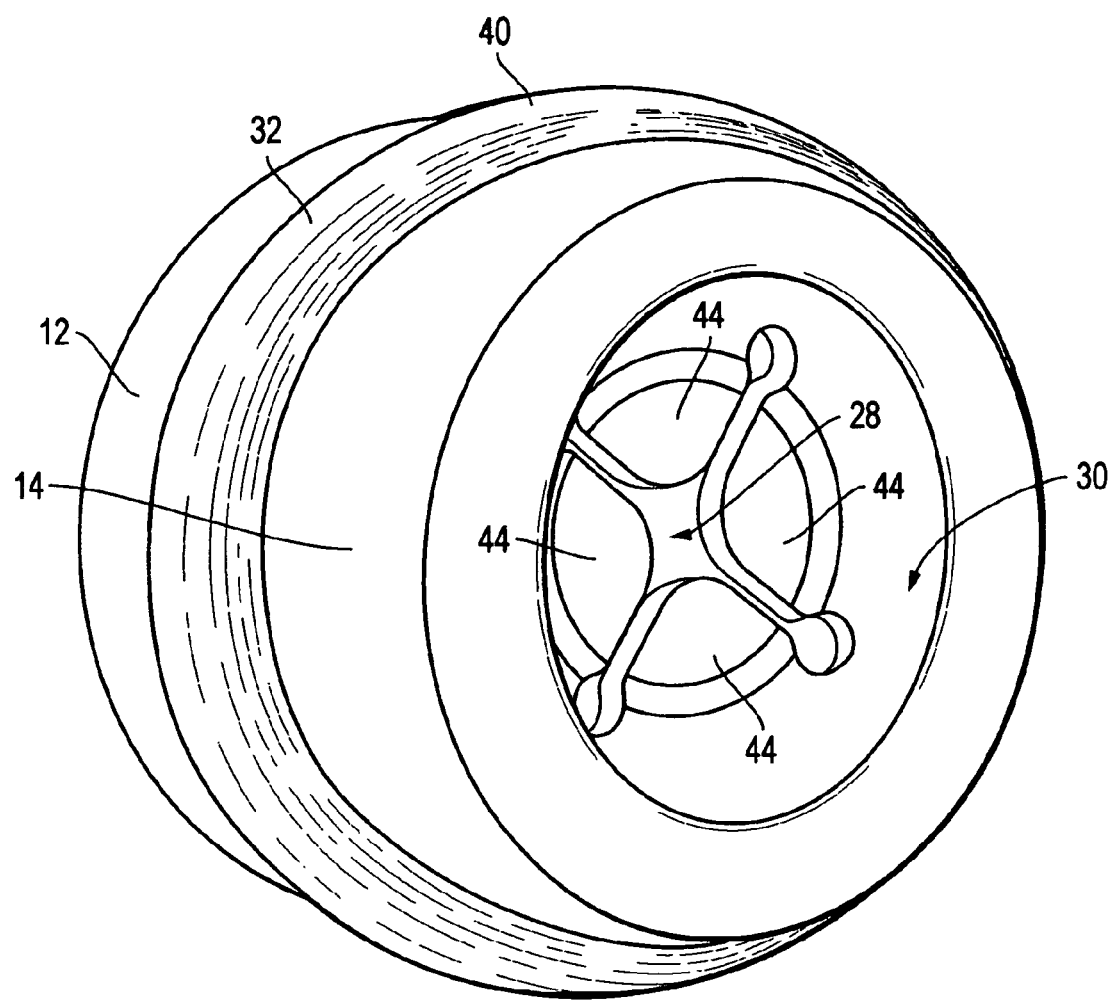
FIG. 5 is a perspective view of an embodiment of the invention of FIG. 1 including at least one at least partially circumferential raised element on the outside of the exterior form.

Referring now to FIG. 5, a perspective view of a preferred embodiment of the invention is presented. According to this embodiment, container apparatus 10 includes an exterior form 12 in the approximate shape of a ball. Exterior form 12 includes at least one opening 30 as well as a separate interior form 18 with a compartment 20 (not shown in this figure). FIG. 5 includes an illustration of one aspect of the invention wherein at least one at least partially circumferential raised element 32 is attached to or formed in the outside 14 of exterior for 12. As illustrated in FIG. 5, raised element 32 takes the form of sinuous, raised edge 40 in this embodiment. Sinuous raised edge 40 ensures that exterior form 12 will wobble while being rolled, pushed, or manipulated. As result, items 26 (not shown in this figure) contained within container apparatus 10 are shaken and manipulated so that, eventually, items 26 exit opening 28 from compartment 20 of interior form 18 and are released into the space 24 of exterior form 12. As previously discussed, removable cap 36, not shown in this figure, is initially in place and, preferably held in place by interior recess 38. According to the aspect wherein removable cap 36 is edible, the animal will first remove at least one, if there are more than one, removable cap 36 by chewing through it. Thereafter, individual items 26, also preferably edible, are then released from the interior space 24 of exterior form 12. Once removable caps 36 have been removed, items 26 are free to exit container apparatus 10 as exterior form 12 is manipulated.

While raised element 32 is shown as a continuous sinuous raised edge 40, it should be understood that a series of separate raised elements may be used to form a raised element as well. Additionally, raised element 32 may only partially surround container 10. Further, there may be simply one raised element 32 at one location on the outside 14 of exterior form 12, that being fully sufficient to cause container 10 to wobble when rolled, etc.

In use, a user inserts items 26 within the inside 16 of container apparatus 10 by first inserting items 26 within the space 22 created by compartment 20 in interior form 18. Certainly, interior form 18 may have multiple compartments 20 and spaces 22 into which items 26 may be placed.

Thereafter, the user installs removable cap(s) 36 in place on exterior form 12. According to a preferred embodiment, removable cap 36 is received and held in place by interior recess 38 as previously described. Removable cap 36, again, may be used in combination with a non-removable cap as desired and, according to one embodiment, removable cap 36 is edible. Thereafter, container apparatus 10 is used to interact with an animal, such as a dog, for example only. Because of raised element 32, in one aspect sinuous raised edge 40, exterior form 12 is caused to wobble as it rolls thereby attracting the dog's attention. The dog is then interested in container apparatus 10, chews on it, and thereby eats and or removes removable cap 36. Thereafter, preferably edible, items 26 are free to exit space 24 of exterior form 12 where they have accumulated prior to removal of removable cap 36. As the animal continues to play with container apparatus 10, additional animal items 26 also are dispersed from compartment 20 of interior form 18 as previously described. Once all the edible items 26 and removable cap(s) 36 have been removed and/or eaten, container apparatus 10 may be reconfigured with new items 26 and a new removable cap 36.

The discussion of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. An animal treat apparatus comprising:
   a unitary resilient member having an outside surface;
   an interior compartment within the unitary resilient member for containing animal treats;
   an aperture within said outside surface providing access to said interior compartment, wherein the aperture lies within a plane and is surrounded by a perimeter lip of the unitary resilient member; and
   an edible animal treat removably retained within the aperture that blocks access to the interior compartment via the aperture, wherein:
      the edible animal treat has a substantially dome-shaped outward-facing surface; and
      when the edible animal treat is removably retained within the aperture, a central portion of the edible animal treat extends outwardly from the unitary resilient member beyond the plane and a peripheral portion of the edible animal treat is resiliently held within the aperture such that, in a direction orthogonal to the plane, the perimeter lip overlays the peripheral portion.

2. The animal treat apparatus of claim 1, wherein the unitary resilient member includes a wall separating the aperture and the interior compartment, the wall having an opening formed therein that allows animal treats to move between the interior compartment and the aperture.

3. The animal treat apparatus of claim 2, wherein the wall includes more than one resilient flap limiting a size of the opening.

4. The animal treat apparatus of claim 2, wherein:
   the plane is a first plane;
   the wall and aperture define a space; and
   a dimension of the space spaced apart from the aperture and in a second plane parallel to a first plane containing the aperture is greater than a maximum dimension of the aperture.

5. The animal treat apparatus of claim 4, wherein the edible animal treat has a size of approximately the dimension of the space.

6. The animal treat apparatus of claim 1, wherein the outside surface of the unitary resilient member is generally spheroidal.

7. The animal treat apparatus of claim 1, wherein the outside surface has at least one raised feature formed thereon.

8. The animal treat apparatus of claim 1, wherein the aperture is a first aperture, and wherein a second aperture is formed in the outside surface that allows animal treats to move between the interior compartment and an exterior of the animal treat apparatus.

9. The animal treat apparatus of claim 8, wherein the unitary resilient member includes a wall separating the second aperture and the interior compartment, the wall having an opening formed therein that allows animal treats to move between the interior compartment and the aperture.

10. The animal treat apparatus of claim 9, wherein the wall includes more than one resilient flap limiting a size of the opening.

11. The animal treat apparatus of claim 1, wherein the unitary resilient member is a ball.

\* \* \* \* \*